(12) United States Patent
Liu et al.

(10) Patent No.: US 9,459,906 B2
(45) Date of Patent: Oct. 4, 2016

(54) METHOD FOR DEPLOYING VIRTUAL MACHINES, DEVICE THEREOF AND MANAGEMENT NODE

(71) Applicant: Lenovo (Beijing) Co., Ltd., Beijing (CN)

(72) Inventors: Jun Liu, Beijing (CN); Jie Yang, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 84 days.

(21) Appl. No.: 14/613,891

(22) Filed: Feb. 4, 2015

(65) Prior Publication Data

US 2016/0062782 A1 Mar. 3, 2016

(30) Foreign Application Priority Data

Aug. 27, 2014 (CN) .......................... 2014 1 0429533

(51) Int. Cl.
*G06F 9/455* (2006.01)

(52) U.S. Cl.
CPC ... *G06F 9/45558* (2013.01); *G06F 2009/4557* (2013.01)

(58) Field of Classification Search
None
See application file for complete search history.

(56) References Cited

U.S. PATENT DOCUMENTS

| 2007/0088762 | A1* | 4/2007 | Harris | G06F 9/52 |
| 2011/0099187 | A1* | 4/2011 | Hansen | G06F 11/2097 707/769 |
| 2012/0216053 | A1* | 8/2012 | Yamashima | G06F 9/5066 713/300 |
| 2015/0178117 | A1* | 6/2015 | Ryu | G06F 9/45558 718/1 |

* cited by examiner

*Primary Examiner* — Dong Kim
(74) *Attorney, Agent, or Firm* — Harness, Dickey & Pierce, P.L.C.

(57) ABSTRACT

A method for deploying virtual machines is provided according to the disclosure, similarity between a first VM and a second VM is determined according to attribution information for the two VMs, and in a case that the first VM is similar to the second VM, the two VMs are deployed to different physical machines respectively. During this process, the similarity between the two VMs are automatically determined, and the two VMs with high similarity, which are more inclined to belong to a same cluster, are deployed to different physical machines, to avoid a problem that malfunction of a physical machine causes malfunction of an entire cluster when VMs belonging to the same cluster are deployed in the same physical machine, thereby improving operation reliability of the cluster.

17 Claims, 5 Drawing Sheets

METHOD FOR DEPLOYING VIRTUAL MACHINES, DEVICE THEREOF AND MANAGEMENT NODE

CROSS REFERENCES OF RELATED APPLICATIONS

The present application claims the priority to Chinese Patent Application No. 201410429533.1, entitled "METHOD FOR DEPLOYING VIRTUAL MACHINES, DEVICE THEREOF AND MANAGEMENT NODE", filed on Aug. 27, 2014 with the State Intellectual Property Office of People's Republic of China, which is incorporated herein by reference in its entirety.

FIELD

The disclosure relates to the field of electronic devices, and in particular to a method for deploying virtual machines, a device thereof and a management node.

BACKGROUND

In an architecture of computer science, a virtual machine (VM) refers to a special software, which can create an environment between a computer platform and a terminal user, and the terminal user operates software through the environment created by the VM software. Through the VM software, a user may simulate multiple VMs in one physical machine to speed up data processing.

In a cloud computing environment, there is large number of clusters consisted of multiple VMs, and the VMs in the cluster are redundant to each other. If the VMs redundant to each other are deployed in a same physical machine, the entire cluster may fail once the physical machine fails.

SUMMARY

In view of this, a method for deploying virtual machines is provided according to the disclosure, to solve a conventional problem that malfunction of a physical machine causes malfunction of an entire cluster when VMs belonging to the same cluster are deployed in the same physical machine.

For this purpose, the technical solutions provided according to the disclosure are as follows.

The method for deploying virtual machines includes:
acquiring attribute information of a first VM and a second VM;
determining, according to the attribute information, whether the first VM is similar to the second VM; and
deploying the first VM and the second VM to a first physical machine and a second physical machine respectively if the first VM is similar to the second VM.

In the method, preferably the first VM and the second VM are deployed to the first physical machine or to the second physical machine if the first VM is not similar to the second VM.

In the method, preferably, the process of determining whether the first VM is similar to the second VM according to the attribute information includes:
assigning weights for the attribute information according to a preset weight assigning rule;
calculating a value of similarity between the first VM and the second VM according to the weights of the attribute information and a preset similarity algorithm;
determining whether the value of the similarity is greater than a preset threshold;
determining that the first VM is similar to the second VM if the value of the similarity is greater than the preset threshold; and
determining that the first VM is not similar to the second VM if the value of the similarity is smaller than or equal to the preset threshold.

In the method, preferably, when it is the first time for VM deployment, the attribute information includes static attribute information, and the process of assigning weights for the attribute information includes:
assigning weights for respective items of the static attribute information according to the preset weight assigning rule.

In the method, preferably, in a case that the deployment is performed when the first VM and the second VM are running, the attribute information includes static attribute information and dynamic attribute information, and the process of acquiring attribute information of a first VM and a second VM includes:
acquiring dynamic attribute information of the first VM and the second VM, where the dynamic attribute information carries first identity information indicating a VM to which the dynamic attribute information belongs;
acquiring static attribute information of the first VM and the second VM, where the static attribute information carries second identity information indicating a VM to which the static attribute information belongs, and the static attribute information was stored when the VM was deployed last time and was stored in a physical machine to which the VM was deployed; and
correlating the dynamic attribute information to the static attribute information according to the first identity information and the second identity information to acquire the attribute information of the first VM and the attribute information of the second VM respectively.

In the method, preferably, the process of assigning weights for the attribute information according to a preset weight assigning rule includes:
assigning, according to the preset weight assigning rule, weights for respective items of the static attribute information and for respective items of the dynamic attribute information.

In the method, preferably, in a case that the first VM and the second VM are connected to the first physical machine, the process of deploying the first VM and the second VM to the first physical machine and the second physical machine respectively includes:
keeping the deployment of the first VM in the first physical machine, and dynamically moving the second VM to the second physical machine.

A device for deploying virtual machines includes:
an acquiring module configured to acquire attribute information of a first VM and a second VM;
a determination module configured to determine, according to the attribute information, whether the first VM is similar to the second VM; and
a deployment module configured to deploy the first VM and the second VM to a first physical machine and a second physical machine respectively if the first VM is similar to the second VM.

In the device, preferably, the deployment device is further configured to deploy the first VM and the second VM to the first physical machine or the second machine if the first VM is not similar to the second VM.

In the device, preferably, the determination module includes:

a weight assigning unit configured to assign weights for the attribute information according to a preset weight assigning rule;

a calculation unit configured to calculate a value of similarity between the first VM and the second VM according the weights of the attribute information and a preset similarity algorithm; and a determination unit configured to determine whether the value of the similarity is greater than a preset threshold; determine that the first VM is similar to the second VM if the value of the similarity is greater than the threshold; and determine that the first VM is not similar to the second VM if the value of the similarity is smaller than or equal to the threshold.

In the device, preferably, when it is the first time for VM deployment, the attribute information includes static attribute information, and the weight assigning unit is further configured to:

assign weights for respective items of the static attribute information according to the preset weight assigning rule.

In the device, preferably, in a case that the deployment is performed when the first VM and the second VM are running, the attribute information includes static attribute information and dynamic attribute information, and the acquiring module includes:

a first acquiring unit configured to acquire the dynamic attribute information of the first VM and the second VM, where the dynamic attribute information carries first identity information indicating a VM to which the dynamic attribute information belongs;

a second acquiring unit configured to acquire the static attribute information of the first VM and the second VM, where the static attribute information carries second identity information indicating a VM to which the static attribute information belongs, and the static attribute information was stored when the VM was deployed last time and was stored in a physical machine to which the VM was deployed; and a correlation unit configured to correlate the dynamic attribute information to the static attribute information according to the first identity information and the second identity information to acquire the attribute information of the first VM and the attribute information of the second VM respectively.

In the method, preferably, the weight assigning unit is configured to:

assign, according to the preset weight assigning rule, weights for respective items of the static attribute information and for respective items of the dynamic attribute information.

In the method, preferably, in a case that the first VM and the second VM are connected to the first physical machine, the deployment module is further configured to:

keep the deployment of the first VM in the first physical machine, and dynamically move the second VM to the second physical machine.

A management node manages at least two physical machines, and includes any one of the foregoing devices for deploying VMs.

It can be known from above technical solutions that, compared with conventional technology, a method for deploying virtual machines is provided according to the disclosure, in which similarity between a first VM and a second VM is determined according to attribute information of the two VMs, and in a case that the first VM is similar to the second VM, the two VMs are deployed to different physical machines respectively. During this process, the similarity between the two VMs are automatically determined according to the attribute information of the VMs, and the two VMs with high similarity, which are more inclined to belong to a same cluster, are deployed to different physical machines to avoid a problem that malfunction of a physical machine causes malfunction of an entire cluster when VMs belonging to the same cluster are deployed in the same physical machine, thereby improving operation reliability of the cluster.

BRIEF DESCRIPTION OF THE DRAWINGS

To describe the technical solutions for the embodiments of the present disclosure or technical solutions in conventional technology more clearly, the drawings involved in the embodiments of the present disclosure or in the conventional technology are described briefly in the following. Apparently, the drawings described below merely illustrate embodiments of the disclosure, and those of ordinary skills in the art can derive other drawings according to the drawings without any creative effort.

DETAILED DESCRIPTION

Technical solutions of the embodiments of the present disclosure will be illustrated completely and clearly with the following drawings of the embodiments of the disclosure. Apparently, the described embodiments are merely a few rather than all of the embodiments of the present disclosure. Any other embodiments obtained by those of ordinary skills in the art based on the embodiments of the present disclosure without creative efforts shall fall within the protection scope of the present disclosure.

The disclosure relates to a method for deploying virtual machines and a device thereof, which are applied to a management node. The management node is connected to at least two physical machines. The management node is an electronic device, which may be any one of desktop, laptop, tablet computer, mobile phone, smart television, smart watch and wearable device.

Figure 1:
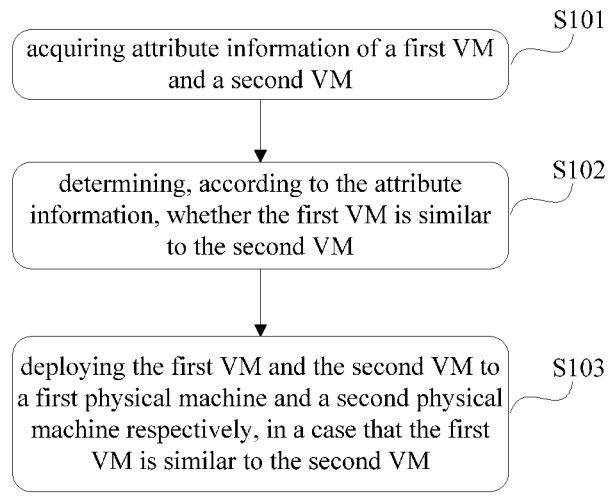
FIG. 1 is a flow chart of a first embodiment of a method for deploying virtual machines provided according to the disclosure.

FIG. 1 is a flow chart of a first embodiment of a method for deploying virtual machines provided according to the disclosure. The method includes following steps.

Step 101 includes: acquiring attribute information of a first VM and a second VM.

The first VM and the second VM are any two of VMs in a cluster consisted of multiple VMs.

The attribute information, including static attribute information and dynamic attribute information, reflects a state of the VM.

The static attribute information includes following information: a name of the VM, an owner of the VM, and hardware feature of the VM, such as a central processing unit (CPU), a memory, a hard disk, a network and a network port, etc.

The dynamic attribute information include following information: information about running state of the VM which is acquired through real-time monitoring, such as direction of network flow, usage rates for CPU and memory, and input/output (I/O) density of a hard disk, etc.

The current state of the VM may be acquired through the attribute information.

Specifically, frequency for network interaction between the first VM and the second VM may be known according to the dynamic attribute information, and the higher the similarity between the dynamic attribute information of the first VM and the dynamic attribute information of the second VM is, the more frequent the network interaction between the first VM and the second VM is. For example, whether the two VMs occupy a same channel or similar channels for transmitting network information, and length of time for the occupation may be determined according to the direction of network flow.

Specially, the similarity between devices of the first VM and the second VM may be known according to the static attribute information. For example, the hardware feature of the VM reflects a usage rate of the VM.

For example, in practical implementation, each VM is preset with a number, and in a case that VMs have similar numbers and belong to a same owner, the VMs are similar.

Step 102 includes: determining, according to the attribute information, whether the first VM is similar to the second VM.

The attribute information of the first VM is compared with that of the second VM to determine whether the attribute information of the first VM is similar to that of the second VM.

Specially, each item of the attribute information of the first VM is compared with corresponding item of the attribute information of the second VM sequentially to acquire a comparison result.

If the comparison result indicates that the attribution information of the first VM is similar to that of the second VM, the first VM is similar to the second VM, and if the comparison result indicates that the attribution information of the first VM is not similar to that of the second VM, the first VM is not similar to the second VM. The similar VMs are more inclined to belong to a same cluster, and are more likely to be redundant to each other. The dissimilar VMs are more inclined to belong to different clusters, and are irrelative to each other and do not interact with each other.

Step 103 includes: deploying the first VM and the second VM to a first physical machine and a second physical machine respectively if the first VM is similar to the second VM.

In a case that the comparison result indicates that the first VM is similar to the second VM, the similar VMs are more inclined to belong to a same cluster, and the first VM and the second VM may be regarded as VMs redundant to each other. To ensure operation reliability of the cluster, the first VM and the second VM need to be deployed to different physical machines.

Specially, the first VM and the second VM are deployed to the first physical machine and the second physical machine, respectively.

In view of above, in the method for deploying virtual machines provided according to the embodiment, similarity between a first VM and a second VM is determined according to attribution information for the two VMs, and in a case that the first VM is similar to the second VM, the two VMs are deployed to different physical machines respectively. During this process, the similarity between the two VMs are automatically determined according to attribution information for the VMs, and the VMs with high similarity, which are more inclined to belong to a same cluster, are deployed to different physical machines, to avoid a problem that malfunction of a physical machine causes malfunction of an entire cluster when VMs belonging to the same cluster are deployed in the same physical machine, thereby improving operation reliability of the cluster.

Figure 2:
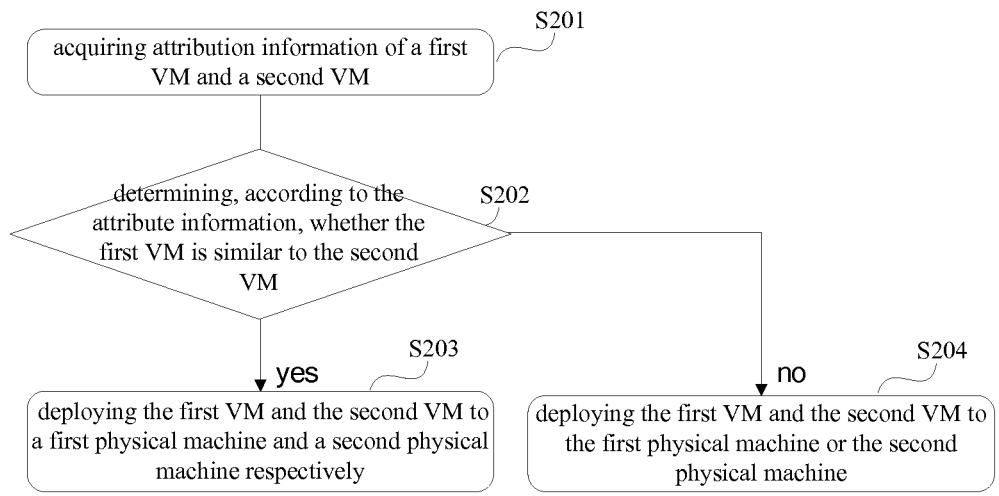
FIG. 2 is a flow chart of a second embodiment of a method for deploying virtual machines provided according to the disclosure.

FIG. 2 is a flow chart of a second embodiment of a method for deploying virtual machines provided according to the disclosure. The method may include following steps.

Step 201 includes: acquiring attribution information of a first VM and a second VM.

Step 202 includes: determining, according to the attribute information, whether the first VM is similar to the second VM.

Step S203 is executed if the first VM is similar to the second VM, and step S204 is executed if the first VM is not similar to the second VM.

Step 203 includes: deploying the first VM and the second VM to a first physical machine and a second physical machine respectively.

Steps S201-S203 are the same as steps S101-103 according to the first embodiment, and are not described in this embodiment.

Step 204 includes: deploying the first VM and the second VM to the first physical machine or to the second physical machine.

In a case that the comparison result indicates that the attribution information of the first VM is not similar to that of the second VM, the first VM is not similar to the second VM. The dissimilar VMs are more inclined to belong to different clusters, and are irrelative to each other and do not interact with each other. In specific implementation, the first VM and the second VM may be deployed arbitrarily.

However, in practical implementation, due to limited number of the physical machines, the first VM and the second VM which are not similar to each other are normally deployed to a same physical machine, i.e., the first VM and the second VM are both deployed to the first physical machine, or to the second physical machine.

In addition, in a case that the first VM and the second VM are deployed in a same physical machine and the first VM has low similarity to the second VM, when subsequent similarity comparison with another VM (such as a third VM) is performed, the comparison with the third VM may be performed on only one of the first VM and the second VM. In a case that the third VM is similar to the first VM, the third VM is not similar to the second VM, and vice versa, thereby reducing amount of information processing for a management node with regard to subsequent similarity comparison between other VMs with the first VM and the second VM, and enabling faster deployment of the VMs.

It should be noted that, in a case that the first VM and the second VM are connected to different physical machines and the first VM is not similar to the second VM, due to a given number of the physical machines and a given number of VMs connected to each physical machine, the lower the similarity among VMs connected to a same physical machine is, the better it is. To reduce pressure of the physical machine, the first VM and the second VM are deployed in a same physical machine.

Specifically, the first VM is kept in the first physical machine where it locates, and the second VM is moved to the first physical machine.

To sum up, a method for deploying virtual machines is provided. The method further includes: deploying the first VM and the second VM to the first physical machine or to the second physical machine if the first VM is not similar to the second VM. With this method, number of occupied physical machines is reduced, and subsequent similarity comparison with other VMs is facilitated.

Figure 3:
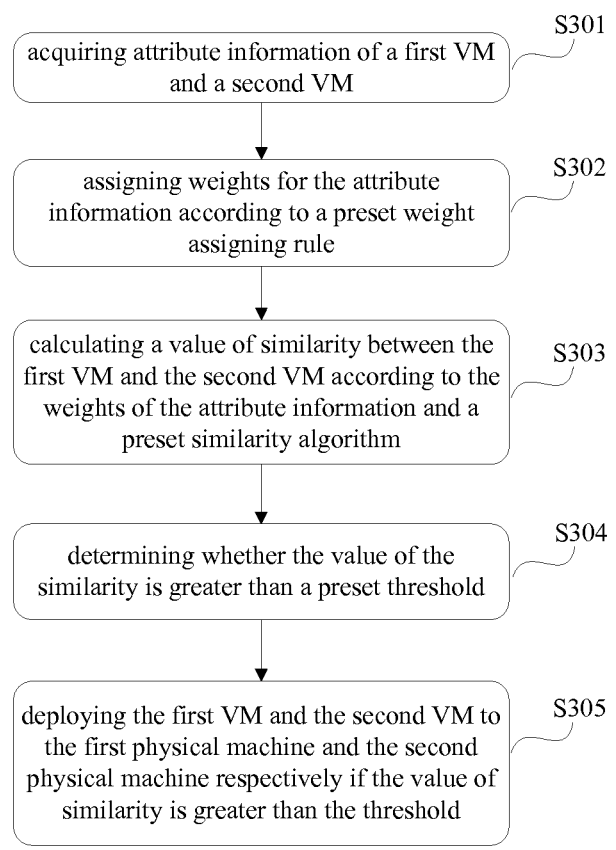
FIG. 3 is a flow chart of a third embodiment of a method for deploying virtual machines provided according to the disclosure.

FIG. 3 is a flow chart of a third embodiment of a method for deploying virtual machines provided according to the disclosure. The method may include following steps.

Step S301 includes: acquiring attribute information of a first VM and a second VM.

Step S301 is the same as step S101 according to the first embodiment, and is not described in this embodiment.

Step 302 includes: assigning weights for the attribute information according to a preset weight assigning rule.

The weight assigning rule is relative to an application environment of the first VM and the second VM.

Specially, important information among the attribute information is determined according to the application environment, and a larger weight is assigned to the important information.

Specially, weights may be assigned to respective items of the attribute information according to actual situation.

For example, if the dynamic attribute information is more important in the application environment, a larger weight is assigned to the dynamic attribute information, a smaller weight is assigned to the static attribute information, and if the direction of network flow in the VM is decisive information among the dynamic attribute information, a larger weight is assigned for the factor of the direction of network flow in the VM; in a case that the static attribute information is more important in the application environment, a larger weight is assigned to the static attribute information while a smaller weight is assigned to the dynamic attribute information, and in a case that respective items of information regarding the owner of the VM is decisive information among the static attribute information, larger weights are assigned to the items of the information regarding the owner of the VM.

It should be noted that, when it is the first time for VM deployment, the attribute information includes static attribute information.

In this case, step S302 includes: assigning weights for respective items of the static attribute information according to the preset weight assigning rule. The dynamic attribute information is not involved.

Step 303 includes: calculating a value of similarity between the first VM and the second VM according to the weights of the attribute information and a preset similarity algorithm.

The similarity algorithm is preset, and calculation is sequentially performed for respective items of the attribute information to acquire the value of the similarity. The similarity between the first VM and the second VM is quantified, and similarity comparison is converted into numerical comparison with higher accuracy.

Applicable similarity algorithms includes: Euclidean distance measure, Manhattan distance measure, cosine distance measure, Tanimoto distance measure and weighted distance measure.

Taking CPU usage as an example, each virtual machine may perform statistics on the CPU usage every minute. Two VMs are arbitrarily selected, and a value of similarity between CPU usages of the two VMs in the last hour is calculated by using the weighted distance measure algorithm. Accordingly, values of similarities between other corresponding items of the attribution information of the two VMs may also be calculated according to the foregoing similarity algorithms, to acquire the values of the similarities between respective pairs of corresponding items of attribute information of the two VMs. Thus a value of the similarity between the two VMs is calculated by using the weighted calculation.

In an implementation, values of similarity between the static attribute information of the first VM and that of the second VM and similarity between the dynamic attribute information of the first VM and that of the second VM may be calculated respectively, then the value of the similarity between the two VMs are finally calculated according to the weight assigned to the static attribute information and the weight assigned to the dynamic attribute information.

For example, the weight assigned to the dynamic attribute information is 0.8, the weight assigned to the static attribute information is 0.2, the value of the similarity between dynamic attribute information of the first VM and that of the second VM is 0.7, and the value of the similarity between static attribute information of the first VM and that of the second VM is 0.5, and the value of the similarity between the first VM and the second VM is calculated as 0.66 based on the value of similarity of the dynamic attribute information, the value of similarity of the static attribute information and weights thereof.

It should be noted that, in an implementation, if the static attribute information is absolutely important and the dynamic attribute information has little affection, the similarity calculation may be only performed on the static attribute information to determine whether the similarity of the static attribute information satisfies a preset threshold condition, and the dynamic attribute information is neglected.

Accordingly, in an implementation, if the dynamic attribute information is absolutely important and the static attribute information has little affection, the similarity calculation may be only performed on the dynamic attribute information to determine whether the similarity of the dynamic attribute information satisfies the preset threshold condition, and the static attribute information is neglected.

Step 304 includes: determining whether the value of the similarity is greater than a preset threshold.

The preset threshold is a critical point of the similarity between the two VMs. In a case that the calculated value of the similarity is greater than the threshold, the first VM is similar to the second VM, and in a case that the calculated value of the similarity is smaller than or equal to the threshold, the first VM is not similar to the second VM.

Specially, the threshold may be set as 0.8, and if the value of the similarity between the first VM and the second VM is 0.76, which is smaller than 0.8, the two VMs are not similar.

In a case that the first VM is similar to the second VM, step S305 is executed to deploy the two VMs to different physical machines.

Step 305 includes: deploying the first VM and the second VM to the first physical machine and the second physical machine respectively if the value of similarity is greater than the threshold.

The step S305 is the same as step S103 and is not described herein.

It should be noted that each time the VM is deployed, the attribute information of the VM needs to be stored.

In an implementation, to reduce amount of data stored in the VM, the static attribute information of the VM may be stored in the physical machined connected to the VM.

To sum up, in the method for deploying virtual machines provided according to the embodiment, the process of determining whether the first VM is similar to the second VM according to the attribute information includes: assigning weights for the attribute information according to a preset weight assigning rule; calculating a value of similarity between the first VM and the second VM according to the weights of the attribute information and a preset similarity algorithm; determining whether the value of the similarity is greater than a preset threshold; determining that the first VM is similar to the second VM if the value of the similarity is greater than the preset threshold; and determining that the first VM is not similar to the second VM if the value of the similarity is smaller than or equal to the preset threshold. With this method, the similarity between the first VM and the second VM may be quantified according to the preset similarity algorithm, and similarity comparison is converted to numerical comparison with higher accuracy.

In a case that the deployment is performed when the first VM and the second VM are running, the attribute information includes the static attribute information and the dynamic attribute information.

Figure 4:
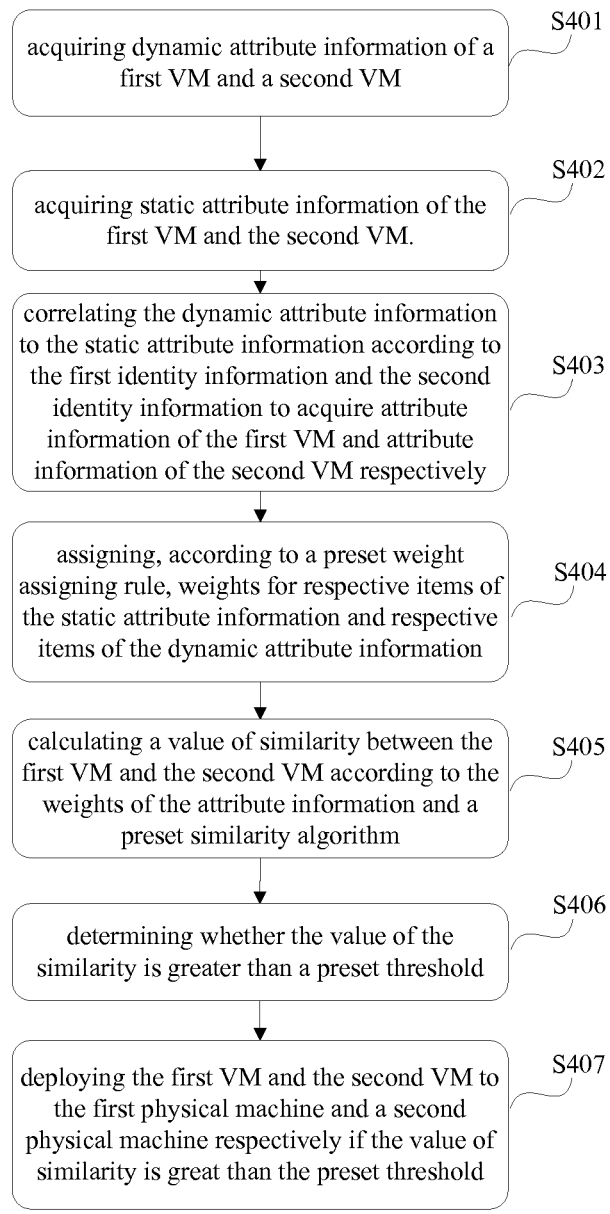
FIG. 4 is a flow chart of a fourth embodiment of a method for deploying virtual machines provided according to the disclosure.

FIG. 4 is a flow chart of a fourth embodiment of a method for deploying virtual machines provided according to the disclosure. The method may include following steps.

Step 401: acquiring dynamic attribute information of a first VM and a second VM.

The dynamic attribute information carries first identity information indicating a VM to which the dynamic attribute information belongs.

It should be noted that the dynamic attribute information is information of parameters adopted in running process of the VM itself, and the dynamic attribute information is acquired from the VM.

Step 402 includes: acquiring static attribute information of the first VM and the second VM.

The static attribute information carries second identity information indicating a VM to which the static attribute information belongs, and the static attribute information was stored when the VM was deployed last time and was stored in a physical machine to which the VM was deployed.

It should be noted that, since the static attribute information was stored when the VM was deployed last time and was stored in a physical machine to which the VM was deployed, for example, the first VM was deployed in a first physical machine, the static attribute information is acquired from the first physical machine.

Surely, after the VM is deployed, instead of being stored in the physical machine to which the VM is deployed, the static attribute information of the VM may be stored in a storage region of the VM, thus the acquisition in this step is to acquire the static attribute information from the storage region of the VM.

Step 403 includes: correlating the dynamic attribute information to the static attribute information according to the first identity information and the second identity information to acquire attribute information of the first VM and attribute information of the second VM respectively.

For a same VM, the first identity information is the same as the second identity information.

Specially, the dynamic attribute information and the static attribute information having same identity information are correlated according to the first identity information and the second identity information to acquire attribute information for one VM.

Specially, the attribute information of the first VM and that of the second VM are acquired respectively in this way.

Step 404 includes: assigning, according to a preset weight assigning rule, weights for respective items of the static attribute information and respective items of the dynamic attribute information.

Specially, weights are assigned for respective items of the attribute information, weights are sequentially assigned for respective items of the static attribute information, and weights are sequentially assigned for respective items of the dynamic attribute information.

Step 405 includes: calculating a value of similarity between the first VM and the second VM according to the weights of the attribute information and a preset similarity algorithm.

Step 406 includes: determining whether the value of the similarity is greater than a preset threshold;

determining that the first VM is similar to the second VM if the value of the similarity is greater than the preset threshold, and determining that the first VM is not similar to the second VM if the value of the similarity is smaller than or equal to the preset threshold.

Steps S405-406 are the same as steps S303-304, and are not described in this embodiment.

Step 407 includes: deploying the first VM and the second VM to the first physical machine and a second physical machine respectively if the value of similarity is great than the preset threshold.

In a case that the value of the similarity is greater than the threshold, the first VM is similar to the second VM, and the first VM and the second VM need to be deployed to different physical machines: the first physical machine and the second physical machine.

In an implementation, in a case that the first VM and the second VM are both connected to the first physical machine, step S407 specially includes: keeping the deployment of the first VM in the first physical machine, and dynamically moving the second VM to the second physical machine; alternatively, keeping the deployment of the second VM in the first physical machine, and dynamically moving the first VM to the second physical machine.

In an implementation, to reduce similarity among VMs connected to a same physical machine, similarities of multiple VMs may be compared, and two VMs with higher similarity are deployed to different physical machines.

For example, a value of similarity between the first VM and the second VM is 0.7, a value of similarity between the first VM and a third VM is 0.6, a value of similarity between the second VM and the third VM is 0.2; although none of the values of the similarities among the three VMs reaches the preset threshold, the first VM with high similarities to the other VMs may be moved to the second physical machine to reduce similarity among VMs connected to the same physical machine.

To sum up, in the method for deploying virtual machines provided according to the embodiment, in a case that deployment is performed when the VMs are running, attribute information includes static attribute information and dynamic attribute information, and the process of acquiring attribute information of a first VM and a second VM includes: acquiring dynamic attribute information of the first VM and the second VM, where the dynamic attribute information carries first identity information indicating a VM to which the dynamic attribute information belongs; acquiring static attribute information of the first VM and the second VM, where static attribute information carries second identity information indicating a VM to which the static attribute information belongs, and the static attribute information was stored when the VM was deployed last time and was stored in a physical machine to which the VM was deployed; and correlating the dynamic attribute information to the static attribute information according to the first identity information and the second identity information, to acquire attribute information of the first VM and attribute information of the second VM respectively. In a case that the first VM and the second VM are connected to the first physical machine, the process of deploying the first VM and the second VM to the first physical machine and a second physical machine respectively includes: keeping the deployment of the first VM in the first physical machine, and dynamically moving the second VM to the second physical machine. With this method, dynamic attribute information and static attribute information of the first VM and the second VM are acquired, therefore attribute information of the VMs is acquired. In addition, two similar VMs which locate at a same physical machine are deployed separately.

The method for deploying virtual machines provided according to the embodiments of the disclosure is described above in details. The method for deploying virtual machines according to the disclosure may be implemented by using deployment devices of multiple forms, thus a device for deploying virtual machines is also provided according to the disclosure, and is described in detail in the following in conjunction with embodiments.

Figure 5:
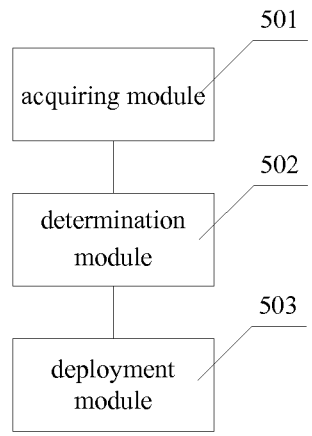
FIG. 5 is a schematic structural diagram of a first embodiment of a device for deploying virtual machines provided according to the disclosure.

FIG. 5 is a schematic structural diagram of a first embodiment of a device for deploying virtual machines provided according to the disclosure. The device may include following structures: an acquiring module 501, a determination module 502 and a deployment module 503.

The acquiring module 501 is configured to acquire attribute information of a first VM and a second VM.

The first VM and the second VM are any two of VMs in a cluster consisted of multiple VMs.

The attribute information, including static attribute information and dynamic attribute information, reflects a state of the VM The static attribute information includes following information: a name of the VM, an owner of the VM, and hardware feature of the VM, such as a central processing unit (CPU), a memory, a hard disk, a network and a network port, etc.

The dynamic attribute information include following information: information about running state of the VM which is acquired through real-time monitoring, such as direction of network flow, usage rates for CPU and memory, and input/output (I/O) density of a hard disk, etc.

The current state of the VM may be acquired through the attribute information.

Specifically, frequency for network interaction between the first VM and the second VM may be known according to the dynamic attribute information, and the higher the similarity between the dynamic attribute information of the first VM and the dynamic attribute information of the second VM is, the more frequent the network interaction between the first VM and the second VM is. For example, whether the two VMs occupy a same channel or similar channels for transmitting network information, and length of time for the occupation may be determined according to the direction of network flow.

Specially, the similarity between devices of the first VM and the second VM may be known according to the static attribute information. For example, the hardware feature of the VM reflects a usage rate of the VM.

For example, in practical implementation, each VM is preset with a number, and in a case that VMs have similar numbers and belong to a same owner, the VMs are similar.

The determination module 502 is configured to determine, according to the attribute information, whether the first VM is similar to the second VM.

The determination module 502 compares attribute information of the first VM with that of the second VM to determine whether the attribute information of the first VM is similar to that of the second VM.

Specially, each item of the attribute information of the first VM is compared with corresponding item of the attribute information of the second VM sequentially to acquire a comparison result.

If the comparison result indicates that the attribution information of the first VM is similar to that of the second VM, the first VM is similar to the second VM, and if the comparison result indicates that the attribution information of the first VM is not similar to that of the second VM, the first VM is not similar to the second VM. The similar VMs are more inclined to belong to a same cluster, and are more likely to be redundant to each other. The dissimilar VMs are more inclined to belong to different clusters, and are irrelative to each other and do not interact with each other.

The deployment module 503 is configured to deploy the first VM and the second VM to a first physical machine and a second physical machine respectively if the first VM is similar to the second VM.

In a case that the comparison result indicates that the first VM is similar to the second VM, the similar VMs are more inclined to belong to a same cluster, and the first VM and the second VM may be regarded as VMs redundant to each other. To ensure operation reliability of the cluster, the first VM and the second VM need to be deployed to different physical machines.

Specially, the deployment module 503 deploys the first VM and the second VM to the first physical machine and the second physical machine respectively.

In an implementation, the deployment module 503 is further configured to deploy the first VM and the second VM to the first physical machine or to the second physical machine if the first VM is not similar to the second VM.

In a case that the comparison result indicates that the attribute information of the first VM is not similar to that of the second VM, the two VMs are not similar to each other; since the two dissimilar VMs are more inclined to belong to different clusters, and are irrelative to each other and do not interact with each other, the first VM and the second VM may be arbitrarily deployed in practice.

However, in practical implementation, due to limited number of physical machines, the first VM and the second VM which are not similar to each other are normally deployed to a same physical machine, i.e., the first VM and the second VM are both deployed to the first physical machine or to the second physical machine.

In addition, in a case that the first VM and the second VM are deployed in a same physical machine and the first VM has low similarity to the second VM, when subsequent similarity comparison with another VM (such as a third VM)

is performed, the comparison with the third VM may be performed on only one of the first VM and the second VM. In a case that the third VM is similar to the first VM, the third VM is not similar to the second VM, and vice versa, thereby reducing amount of information processing for a management node with regard to subsequent similarity comparison between other VMs with the first VM and the second VM, and enabling faster deployment of the VMs.

It should be noted that, in a case that the first VM and the second VM are connected to different physical machines and if the first VM is not similar to the second VM, due to a given number of the physical machines and a given number of VMs connected to each physical machines, the lower the similarity among VMs connected to a same physical machine is, the better it is. To reduce pressure of the physical machine, the first VM and the second VM are deployed in a same physical machine.

Specifically, the first VM is kept in the first physical machine where it locates, and the second VM is moved to the first physical machine.

To sum up, the device for deploying virtual machines provided according to the embodiment determines similarity between the first VM and the second VM according to attribute information of the two VMs, and deploys the two VMs to different physical machines if the first VM is similar to the second VM. With this device, the similarity between the two VMs is automatically determined according to the attribute information of the VMs, and the two VMs with high similarity, which are more inclined to belong to a same cluster, are deployed to different physical machines, to avoid a problem that malfunction of a physical machine causes malfunction of an entire cluster when VMs belonging to the same cluster are deployed in the same physical machine, thereby improving operation reliability of the cluster.

Figure 6:
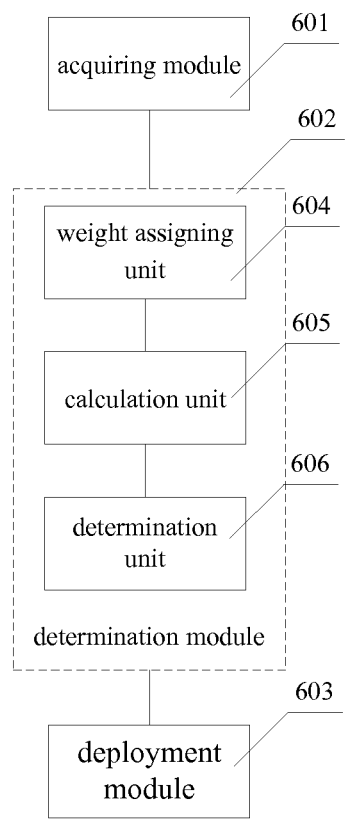
FIG. 6 is a schematic structural diagram of a second embodiment of a device for deploying virtual machines provided according to the disclosure.

FIG. 6 is a schematic structural diagram of a second embodiment of a device for deploying virtual machines provided according to the disclosure. The device may include following structures: an acquiring module 601, a determination module 602 and a deployment module 603.

The determination module 602 includes: a weight assigning unit 604, a calculation unit 605 and a determination unit 606.

Functions of the acquiring module 601 and the deployment module 603 are the same as those corresponding structures according to the first embodiment, and are not described in this embodiment.

The weight assigning unit 604 is configured to assign weights for the attribute information according to a preset weight assigning rule.

The weight assigning rule is relative to an application environment of the first VM and the second VM.

Specially, the weight assigning unit 604 determines important information among the attribute information according to the application environment, and assigns a larger weight to the important information.

Specially, weights may be assigned to respective items of the attribute information according to actual situation.

For example, if the dynamic attribute information is more important in the application environment, a larger weight is assigned to the dynamic attribute information, a smaller weight is assigned to the static attribute information, and if the direction of network flow in the VM is decisive information among the dynamic attribute information, a larger weight is assigned for the factor of the direction of network flow in the VM; in a case that the static attribute information is more important in the application environment, a larger weight is assigned to the static attribute information while a smaller weight is assigned to the dynamic attribute information, and in a case that respective items of information regarding the owner of the VM is decisive information among the static attribute information, larger weights are assigned to the items of the information regarding the owner of the VM.

It should be noted that when it is the first time for VM deployment, the attribute information includes the static attribute information.

In this case, the weight assigning unit 604 is further configured to assign weights for respective items of the static attribute information according to the preset weight assigning rule. The dynamic attribute information is not involved.

The calculation unit 605 is configured to calculate a value of similarity between the first VM and the second VM according to the weights of the attribute information and a preset similarity algorithm.

The similarity algorithm is preset, and the calculation unit 605 performs calculation for respective items of the attribute information sequentially according to the preset similarity algorithm, to acquire the value of the similarity. The similarity between the first VM and the second VM is quantified, and similarity comparison is converted into numerical comparison with higher accuracy.

Applicable similarity algorithms includes: Euclidean distance measure, Manhattan distance measure, cosine distance measure, Tanimoto distance measure and weighted distance measure.

Taking CPU usage as an example, each virtual machine may perform statistics on the CPU usage every minute. Two VMs are arbitrarily selected, and a value of similarity between CPU usages of the two VMs in the last hour is calculated by using the weighted distance measure algorithm. Accordingly, values of similarities between other corresponding items of the attribution information of the two VMs may also be calculated according to the foregoing similarity algorithms, to acquire the values of the similarities between respective pairs of corresponding items of attribute information of the two VMs. Thus a value of the similarity between the two VMs is calculated by using the weighted calculation.

In an implementation, values of similarity between the static attribute information of the first VM and that of the second VM and similarity between the dynamic attribute information of the first VM and that of the second VM may be calculated respectively, then the value of the similarity between the two VMs are finally calculated according to the weight assigned to the static attribute information and the weight assigned to the dynamic attribute information.

For example, the weight assigned to the dynamic attribute information is 0.8, the weight assigned to the static attribute information is 0.2, the value of the similarity between dynamic attribute information of the first VM and that of the second VM is 0.7, and the value of the similarity between static attribute information of the first VM and that of the second VM is 0.5, and the value of the similarity between the first VM and the second VM is calculated as 0.66 based on the value of similarity of the dynamic attribute information, the value of similarity of the static attribute information and weights thereof.

It should be note that, in an implementation, if the static attribute information is absolutely important, and the dynamic attribute information has little affection, the similarity calculation may be only performed on the static attribute information to determine whether the similarity of the static attribute information satisfies a preset threshold condition, and the dynamic attribute information is neglected.

Accordingly, in an implementation, if the dynamic attribute information is absolutely important and the static attribute information has little affection, the similarity calculation may be only performed on the dynamic attribute information to determine whether the similarity of the dynamic attribute information satisfies the preset threshold condition, and the static attribute information is neglected.

The determination unit 606 is configured to determine whether the value of the similarity is greater than a preset threshold; determine that the first VM is similar to the second VM if the value of the similarity is greater than the threshold; and determine that the first VM is not similar to the second VM if the value of the similarity is smaller than or equal to the threshold.

The preset threshold is a critical point of the similarity between the two VMs. In a case that the calculated value of the similarity is greater than the threshold, the determination unit 606 determines that the first VM is similar to the second VM, and in a case that the calculated value of the similarity is smaller than or equal to the threshold, the determination unit 606 determines that the first VM is not similar to the second VM.

Specially, the threshold may be set as 0.8, and in a case that the value of the similarity between the first VM and the second VM is 0.76, which is smaller than 0.8, the two VMs are not similar to each other.

In a case that the first VM is similar to the second VM, the deployment module 603 is triggered to deploy the two similar VMs to different physical machines.

It should be noted that, each time the VM is deployed, the attribute information of the VM needs to be stored.

In an implementation, to reduce amount of data stored in the VM, the static attribute information of the VM may be stored in the physical machined connected to the VM.

To sum up, in the device for deploying virtual machines provided according to the embodiment, the determination module includes: a weight assigning unit configured to assign weights for the attribute information according to a preset weight assigning rule; a calculation unit configured to calculate a value of similarity between the first VM and the second VM according to the weights of the attribute information and a preset similarity algorithm; a determination unit configured to determine whether the value of the similarity is greater than a preset threshold, determine that the first VM is similar to the second VM if the value of the similarity is greater than the preset threshold, and determine that the first VM is not similar to the second VM if the value of the similarity is smaller than or equal to the preset threshold. With this device, the similarity between the first VM and the second VM may be quantified according to the preset similarity algorithm, and similarity comparison is converted to numerical comparison with higher accuracy.

In a case that the deployment is performed when the first VM and the second VM are running, the attribute information includes the static attribute information and the dynamic attribute information.

Figure 7:
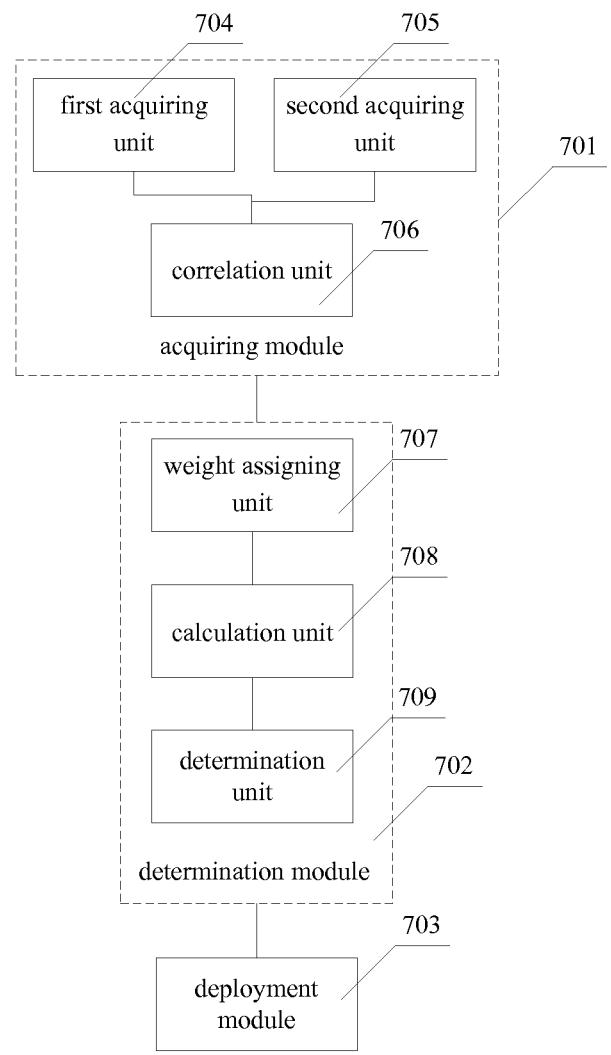
FIG. 7 is a schematic structural diagram of a third embodiment of a device for deploying virtual machines provided according to the disclosure.

FIG. 7 is a schematic structural diagram of a third embodiment of a device for deploying virtual machines provided according to the disclosure. The device may include following structures: an acquiring module 701, a determination module 702 and a deployment module 703.

The acquiring module 701 includes: a first acquiring unit 704, a second acquiring unit 705 and a correlation unit 706.

The determination module 702 includes: a weight assigning unit 707, a calculation unit 708 and a determination unit 709.

The calculation unit 708 and the determination unit 709 have same functions as those corresponding structures according to the second embodiment, and are not described in this embodiment.

The first acquiring unit 704 is configured to acquire dynamic attribute information of a first VM and a second VM.

The dynamic attribute information carries first identity information indicating a VM to which the dynamic attribute information belongs.

It should be noted that the dynamic attribute information is information of parameters adopted in running process of the VM itself, and the dynamic attribute information is acquired from the VM.

The second acquiring unit 705 is configured to acquire static attribute information of the first VM and the second VM.

The static attribute information carries second identity information indicating a VM to which the static attribute information belongs, and the static attribute information was stored when the VM was deployed last time and was stored in a physical machine to which the VM was deployed.

It should be noted that, since the static attribute information was stored when the VM was deployed last time and was stored in a physical machine to which the VM was deployed, for example, the first VM was deployed in a first physical machine, the static attribute information is acquired from the first physical machine.

Surely, after the VM is deployed, instead of being stored in the physical machine to which the VM is deployed, the static attribute information of the VM may be stored in a storage region of the VM, thus the acquisition in this step is to acquire the static attribute information from the storage region of the VM.

The correlation unit 706 is configured to correlate the dynamic attribute information to the static attribute information according to the first identity information and the second identity information to acquire attribute information of the first VM and attribute information of the second VM respectively.

For a same VM, the first identity information is the same as the second identity information.

Specially, the dynamic attribute information and the static attribute information having same identity information are correlated according to the first identity information and the second identity information to acquire attribute information for one VM.

Specially, the attribute information of the first VM and that of the second VM are acquired respectively in this way.

The weight assigning unit 707 is further configured to assign, according to a preset weight assigning rule, weights for respective items of the static attribute information and respective items of the dynamic attribute information.

Specially, the weight assigning unit assigns weights for respective items of the attribute information, sequentially assigns weights for respective items of the static attribute information, and sequentially assigns weights for respective items of the dynamic attribute information.

In a case that the value of the similarity is greater than the threshold, the first VM is similar to the second VM, and the first VM and the second VM need to be deployed to different physical machines: the first physical machine and the second physical machine.

In an implementation, in a case that the first VM and the second VM are both connected to the first physical machine, the deployment module 703 is configured to: keep the deployment of the first VM in the first physical machine, and dynamically move the second VM to the second physical machine; alternatively, keep the deployment of the second VM in the first physical machine, and dynamically move the first VM to the second physical machine.

In an implementation, to reduce similarity among VMs connected to a same physical machine, similarities of multiple VMs may be compared, and two VMs with higher similarity are deployed to different physical machines.

For example, a value of similarity between the first VM and the second VM is 0.7, a value of similarity between the first VM and a third VM is 0.6, a value of similarity between the second VM and the third VM is 0.2; although none of the values of the similarities among the three VMs reaches the preset threshold, the first VM with high similarities to the other VMs may be moved to the second physical machine to reduce similarity among VMs connected to the same physical machine.

To sum up, in the device for deploying virtual machines provided according to the embodiment, in a case that deployment is performed when the first VM and the second VM are running, attribute information includes static attribute information and dynamic attribute information, and the acquiring module includes: a first acquiring unit configured to acquire dynamic attribute information of the first VM and the second VM, where the dynamic attribute information carries first identity information indicating a VM to which the dynamic attribute information belongs; a second acquiring unit configured to acquire static attribute information of the first VM and the second VM, where static attribute information carries second identity information indicating a VM to which the static attribute information belongs, and the static attribute information was stored when the VM was deployed last time and was stored in a physical machine to which the VM was deployed; and a correlation unit configured to correlate the dynamic attribute information to the static attribute information according to the first identity information and the second identity information to acquire attribute information of the first VM and attribute information of the second VM respectively. In a case that the first VM and the second VM are connected to the first physical machine, the deployment module is further configured to keep the deployment of the first VM in the first physical machine, and dynamically moves the second VM to the second physical machine. With this device, dynamic attribute information and static attribute information of the first VM and the second VM are acquired, therefore attribute information of the VMs is acquired. In addition, two similar VMs which locate at a same physical machine are deployed separately.

Corresponding to the foregoing embodiments of the device for deploying virtual machines provided according to the disclosure, a management node is also provided according to the disclosure. The management node manages at least two physical machines, and includes the device for deploying VMs according to any one of above embodiments.

The deployment device includes: an acquiring module, a determination module and a deployment module. Each component module of the device for deploying virtual machines has the same function as that of a corresponding structure of the foregoing device for deploying virtual machines according to the embodiments, and is not described herein.

Preferably, the deployment module is further configured to deploy the first VM and the second VM to a first physical machine or to a second physical machine if the first VM is not similar to the second VM.

Preferably, the determination module includes: a weight assigning unit, a calculation unit and a determination unit. Each component unit in the module of the device for deploying virtual machines has the same function as that of a corresponding structure in the foregoing device for deploying virtual machines according to the embodiments, and is not described herein.

Preferably, when it is the first time for VM deployment, the attribute information includes the static attribute information, and the weight assigning unit is configured to assign weights for respective items of the static attribute information according to a preset weight assigning rule.

Preferably, in a case that the deployment is performed when the first VM and the second VM are running, the attribute information includes the static attribute information and the dynamic attribute information, and the acquiring module includes: a first acquiring unit, a second acquiring unit and a correlation unit, where each component unit in the module of the device for deploying virtual machines has a same function as that of a corresponding structure in the device for deploying virtual machines according to the embodiments, and is not described herein.

Preferably, the weight assigning unit is configured to assign weights for respective items of the dynamic attribute information and assign weights for respective items of the static attribute information according to a preset weight assigning rule.

Preferably, in a case that the first VM and the second VM are connected to the first physical machine, the deployment module is configured to keep the deployment of the first VM in the first physical machine, and dynamically move the second VM to the second physical machine.

The embodiments of the present disclosure are described in a progressive manner and each embodiment places emphasis on the difference from other embodiments, therefore, one embodiment can refer to other embodiments for the same or similar parts. For the embodiments of the device, since the embodiments of the device correspond to the embodiments of the method, the description is relative simple, and relative description refers to parts of description of the embodiments of the method.

According to the description of the disclosed embodiments, the disclosure may be implemented or used by the person skilled in the art. Various modifications made to these embodiments are apparent for persons skilled in the art, and a normal principle defined in the disclosure may be implemented in other embodiments without departing from spirit or scope of the disclosure. Therefore the disclosure is not limited to the embodiments described in the disclosure but confirms to a widest scope in accordance with principles and novel features disclosed in the disclosure.

The invention claimed is:

1. A method for deploying virtual machines, comprising:
   acquiring attribute information of a first VM and a second VM;
   determining, according to the attribute information, whether the first VM is similar to the second VM; and
   deploying the first VM and the second VM to a first physical machine and a second physical machine respectively if the first VM is similar to the second VM,
   wherein the similarity is determined based a calculation of a value according to weights assigned to the attribute information and a preset similarity algorithm; and wherein the deployment is performed when the first VM and the second VM are running, the attribute information comprises static attribute information and dynamic attribute information, and the acquiring attribute information comprises:

acquiring the dynamic attribute information of the first VM and the second VM, wherein the dynamic attribute information carries first identity information indicating a VM to which the dynamic attribute information belongs;

acquiring the static attribute information of the first VM and the second VM, wherein the static attribute information carries second identity information indicating a VM to which the static attribute information belongs, and the static attribute information was stored when the VM was deployed last time and was stored in a physical machine to which the VM was deployed; and correlating the dynamic attribute information to the static attribute information according to the first identity information and the second identity information to acquire the attribute information of the first VM and the attribute information of the second VM respectively.

2. The method according to claim 1, wherein the first VM and the second VM are deployed to the first physical machine or to the second physical machine if the first VM is not similar to the second VM.

3. The method according to claim 1, wherein the process of determining whether the first VM is similar to the second VM according to the attribute information comprises:

determining whether the value of the similarity is greater than a preset threshold;

determining that the first VM is similar to the second VM if the value of the similarity is greater than the preset threshold; and determining that the first VM is not similar to the second VM if the value of the similarity is smaller than or equal to the preset threshold.

4. The method according to claim 3, wherein when it is the first time for VM deployment, the attribute information comprises static attribute information, and the process of assigning weights for the attribute information comprises:

assigning weights for respective items of the static attribute information according to a preset weight assigning rule.

5. The method according to claim 4, wherein the process of assigning weights for the attribute information according to the preset weight assigning rule comprises:

assigning, according to the preset weight assigning rule, weights for respective items of the static attribute information and for respective items of the dynamic attribute information.

6. The method according to claim 1, wherein in a case that the first VM and the second VM are connected to the first physical machine, the process of deploying the first VM and the second VM to the first physical machine and the second physical machine respectively comprises:

keeping the deployment of the first VM in the first physical machine, and dynamically moving the second VM to the second physical machine.

7. A device for deploying virtual machines, comprising:
an acquiring module configured to acquire attribute information of a first VM and a second VM;
a determination module configured to determine, according to the attribute information, whether the first VM is similar to the second VM; and
a deployment module configured to deploy the first VM and the second VM to a first physical machine and a second physical machine respectively if the first VM is similar to the second VM, wherein the determination module comprises:
a weight assigning unit configured to assign weights for the attribute information according to a preset weight assigning rule, and
a calculation unit configured to calculate a value of similarity between the first VM and the second VM according the weights of the attribute information and a preset similarity algorithm, wherein in a case that the deployment is performed when the first VM and the second VM are running, the attribute information comprises static attribute information and dynamic attribute information, and the acquiring module comprises:
a first acquiring unit configured to acquire the dynamic attribute information of the first VM and the second VM, wherein the dynamic attribute information carries first identity information indicating a VM to which the dynamic attribute information belongs;
a second acquiring unit configured to acquire the static attribute information of the first VM and the second VM, wherein the static attribute information carries second identity information indicating a VM to which the static attribute information belongs, and the static attribute information was stored when the VM was deployed last time and was stored in a physical machine to which the VM was deployed; and
a correlation unit configured to correlate the dynamic attribute information to the static attribute information according to the first identity information and the second identity information to acquire the attribute information of the first VM and the attribute information of the second VM respectively, and wherein the acquiring module, the determination module, the deployment module are implemented via a physical processor.

8. The device according to claim 7, wherein the deployment module is further configured to deploy the first VM and the second VM to the first physical machine or to the second physical machine if the first VM is not similar to the second VM.

9. The device according to claim 7, wherein the determination module comprises:

a determination unit configured to determine whether the value of the similarity is greater than a preset threshold; determine that the first VM is similar to the second VM if the value of the similarity is greater than the threshold, and determine that the first VM is not similar to the second VM if the value of the similarity is smaller than or equal to the threshold.

10. The device according to claim 9, wherein when it is the first time for VM deployment, the attribute information comprises static attribute information, and the weight assigning unit is further configured to:

assign weights for respective items of the static attribute information according to the preset weight assigning rule.

11. The device according to claim 10, wherein the weight assigning unit is further configured to:

assign, according to the preset weight assigning rule, weights for respective items of the static attribute information and for respective items of the dynamic attribute information.

12. The device according to claim 9, wherein in a case that the first VM and the second VM are connected to the first physical machine, the deployment module is further configured to:
  keep the deployment of the first VM in the first physical machine, and dynamically move the second VM to the second physical machine.

13. A management node, wherein the management node manages at least two physical machines, and comprises a device for deploying VMs, wherein the device for deploying VMs comprises
  an acquiring module configured to acquire attribute information of a first VM and a second VM;
  a determination module configured to determine, according to the attribute information, whether the first VM is similar to the second VM;
  a deployment module configured to deploy the first VM and the second VM to a first physical machine and a second physical machine respectively if the first VM is similar to the second VM;
  wherein the determination module comprises:
    a weight assigning unit configured to assign weights for the attribute information according to a preset weight assigning rule; and
    a calculation unit configured to calculate a value of similarity between the first VM and the second VM according the weights of the attribute information and a preset similarity algorithm,
  wherein in a case that the deployment is performed when the first VM and the second VM are running, the attribute information comprises static attribute information and dynamic attribute information, and the acquiring module comprises:
    a first acquiring unit configured to acquire the dynamic attribute information of the first VM and the second VM, wherein the dynamic attribute information carries first identity information indicating a VM to which the dynamic attribute information belongs;
    a second acquiring unit configured to acquire the static attribute information of the first VM and the second VM, wherein the static attribute information carries second identity information indicating a VM to which the static attribute information belongs, and the static attribute information was stored when the VM was deployed last time and was stored in a physical machine to which the VM was deployed; and
    a correlation unit configured to correlate the dynamic attribute information to the static attribute information according to the first identity information and the second identity information to acquire the attribute information of the first VM and the attribute information of the second VM respectively, and
  wherein the acquiring module, the determination module, the deployment module are implemented via a physical processor.

14. The management node according to claim 13, wherein the deployment module is further configured to deploy the first VM and the second VM to the first physical machine or to the second physical machine if the first VM is not similar to the second VM.

15. The management node according to claim 13, wherein the determination module comprises:
  a determination unit configured to determine whether the value of the similarity is greater than a preset threshold; determine that the first VM is similar to the second VM if the value of the similarity is greater than the threshold, and determine that the first VM is not similar to the second VM if the value of the similarity is smaller than or equal to the threshold.

16. The management node according to claim 15, wherein when it is the first time for VM deployment, the attribute information comprises static attribute information, and the weight assigning unit is further configured to:
  assign weights for respective items of the static attribute information according to the preset weight assigning rule.

17. The management node according to claim 16, wherein the weight assigning unit is further configured to:
  assign, according to the preset weight assigning rule, weights for respective items of the static attribute information and for respective items of the dynamic attribute information.

* * * * *